（12）United States Patent
Schober et al.

(10) Patent No.: US 11,166,296 B2
(45) Date of Patent: Nov. 2, 2021

(54) INDICATING UE CAPABILITY WITH SHORT TTI

(71) Applicant: Nokia Technologies Oy, Espoo (FI)

(72) Inventors: Karol Schober, Helsinki (FI); Timo Erkki Lunttila, Espoo (FI); Klaus Hugl, Vienna (AT)

(73) Assignee: Nokia Technologies Oy, Espoo (FI)

( * ) Notice: Subject to any disclaimer, the term of this patent is extended or adjusted under 35 U.S.C. 154(b) by 157 days.

(21) Appl. No.: 16/638,053

(22) PCT Filed: Aug. 11, 2017

(86) PCT No.: PCT/EP2017/070473
§ 371 (c)(1),
(2) Date: Feb. 10, 2020

(87) PCT Pub. No.: WO2019/029825
PCT Pub. Date: Feb. 14, 2019

(65) Prior Publication Data
US 2020/0221472 A1 Jul. 9, 2020

(51) Int. Cl.
H04W 4/00 (2018.01)
H04W 72/12 (2009.01)
(52) U.S. Cl.
CPC ................................ H04W 72/1252 (2013.01)
(58) Field of Classification Search
CPC ............... H04W 72/042; H04W 76/27; H04W 72/1252; H04L 5/0053; H04L 1/1812; H04L 5/0055
See application file for complete search history.

(56) References Cited

U.S. PATENT DOCUMENTS

| 9,451,489 | B2* | 9/2016 | Gholmieh | ................. H04L 1/00 |
| 2006/0239226 | A1* | 10/2006 | Khan | .................. H04B 7/0684 370/329 |
| 2006/0285484 | A1* | 12/2006 | Papasakellariou | ... H04B 7/0452 370/208 |
| 2007/0217328 | A1* | 9/2007 | A.M. Bune | ........... H04L 5/0048 370/208 |
| 2012/0236809 | A1* | 9/2012 | Senoo | ................. H04L 27/2657 370/329 |

(Continued)

OTHER PUBLICATIONS

"Revised Work Item on shortened TTI and processing time for LTE", 3GPP TSG RAN Meeting #76, RP-171468, Agenda : 10.11.1, Ericsson, Jun. 5-8, 2017, 5 pages.

(Continued)

Primary Examiner — Atique Ahmed
(74) Attorney, Agent, or Firm — Nokia Technologies Oy

(57) ABSTRACT

It is provided a method, comprising estimating a future instantaneously required processing effort required by a terminal to process symbols received in at least one first transmission time interval and at least one second transmission time interval; checking if the estimated future instantaneously required processing effort exceeds a capability of the terminal to process the symbols; modifying a future scheduling of the symbols for the terminal if the future instantaneously required processing effort exceeds the capability; wherein the first transmission time intervals and the second transmission time intervals are of different types.

20 Claims, 7 Drawing Sheets

(56) References Cited

U.S. PATENT DOCUMENTS

2015/0117248 A1* 4/2015 Garcia .................. H04W 4/029
370/252

OTHER PUBLICATIONS

"WF on Dynamic Switching from PDSCH Scheduling to sPDSCH Scheduling", 3GPP TSG RAN1 #89, R1-1709761, Agenda : 6.2.1.2.1.3, Qualcomm, May 15-19, 2017, 3 pages.

"Aspects Related to the Dynamic Switching Between 1 ms TTI and sTTI", 3GPP TSG RAN WG1 #89, R1-1708765, Agenda : 6.2.1.2.1.3, Qualcomm Incorporated, May 5-19, 2017, pp. 1-3.

International Search Report and Written Opinion received for corresponding Patent Cooperation Treaty Application No. PCT/EP2017/070473, dated Apr. 19, 2018, 14 pages.

HARQ process handling and maximum processing capability for shortened TTI, 3GPP TSG-RAN WG1 Meeting #89, R1-1708187, Agenda : 6.2.1.2.1.3, Nokia, May 15-19, 2017, 6 pages.

"On dynamic switching between 1 ms TTI and sTTI", 3GPP TSG-RAN WG1 Meeting #89, R1-1708860, Agenda : 6.2.1.2.1.3, Ericsson, May 15-19, 2017, 7 pages.

"Chairman's notes of AI 6.2.1 Shortened TTI and processing time for LTE", 3GPP TSG RAN WG 1 Meeting #89, R1-1709686, Agenda : 6.2.1, Ericsson, May 15-19, 2017, 14 pages.

"3rd Generation Partnership Project; Technical Specification Group Radio Access Network; Evolved Universal Terrestrial Radio Access (E-UTRA); Physical layer procedures (Release 15)", 3GPP TS 36.213, V15.1.0, Mar. 2018, pp. 1-501.

Office action received for corresponding European Patent Application No. 17755127.2, dated Oct. 5, 2020, 6 pages.

Office action received for corresponding European Patent Application No. 17755127.2, dated Feb. 1, 2021, 3 pages.

Office action received for corresponding Indian Patent Application No. 202017006378, dated Jun. 2, 2021, 7 pages.

Office action received for corresponding European Patent Application No. 17755127.2, dated Aug. 27, 2021, 6 pages.

\* cited by examiner

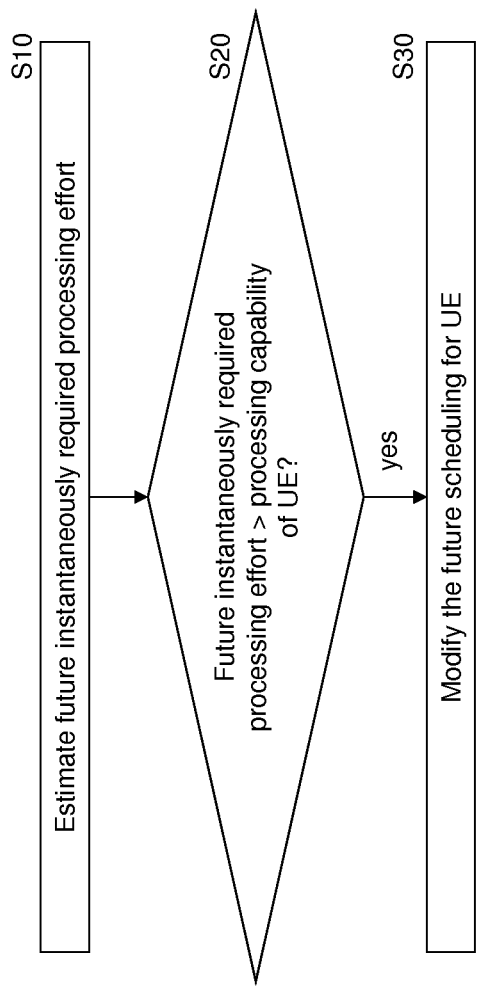
Fig. 8
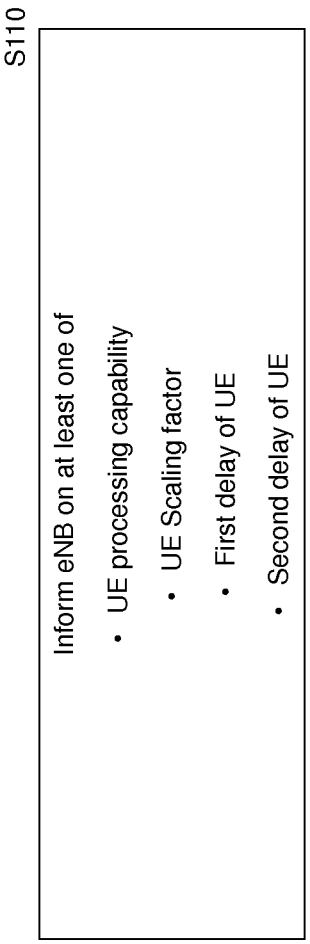
Fig. 10
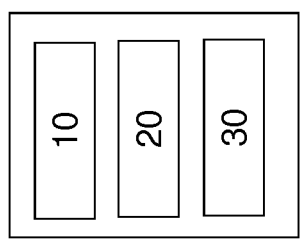
Fig. 7
Fig. 9

INDICATING UE CAPABILITY WITH SHORT TTI

RELATED APPLICATION

This application was originally filed as PCT Application No. PCT/EP2017/070473 filed Aug. 11, 2017.

FIELD OF THE INVENTION

The present invention relates to an apparatus, a method, and a computer program product related to radio transmission, in particular to radio transmission with TTIs of different kinds.

Abbreviations

3GPP 3$^{rd}$ Generation Partnership Project
5G 5$^{th}$ Generation
ACK Acknowledgment
ARI Acknowledgment resource indicator
CC Component Carrier
CSI Channel State Information
D2D Device-to-Device (Communication)
DCI Downlink Control Information
DL Downlink
DL-SCH Downlink Shared Channel
eNB Evolved NodeB
HARQ Hybrid Automatic Repeat Request
IoT Internet of Things
LTE Long Term Evolution
MCS Modulation and Coding Scheme
MIMO Multiple-Input Multiple-Output
MTC Machine-type Communication
NAK Non-Acknowledgment
OFDM Orthogonal Frequency Division Multiplex
PDSCH Physical Downlink Shared Channel
PDCCH Physical Downlink Control Channel
PRB Physical Resource Block
PUCCH Physical Uplink Control Channel
PUSCH Physical Uplink Shared Channel
RAN Radio Access Network
RB Resource Block
Rel Release
sPDSCH Short Physical Downlink Shared Channel
sPDCCH Short Physical Downlink Control Channel
sPUCCH Short Physical Uplink Control Channel
sPUSCH Short Physical Uplink Shared Channel
SR Scheduling Request
sTTI Short TTI
TBS Transport Block Size
TDoc Technical Document
TTI Transmission Time Interval
UE User Equipment
WiFi Wireless Fidelity

BACKGROUND OF THE INVENTION

LTE-Advanced Pro system, which will be part of 3GPP LTE Rel-15, has a focus on latency reduction. The related Rel-14/15 Work Item "New Work Item on shortened TTI (sTTI) and processing time for LTE" (3GPP RP-171468) is carried out during 2H/2016 and 2017 in 3GPP. The objectives of the work item are:

For Frame structure type 1: [RAN1, RAN2, RAN4]
  Specify support for a transmission duration based on
    2-symbol sTTI and 1-slot sTTI for sPDSCH/sPDCCH
  Specify support for a transmission duration based on
    2-symbol sTTI, 4-symbol sTTI, and 1-slot sTTI for sPUCCH/sPUSCH
  Down-selection is not precluded
  Study any impact on CSI feedback and processing time, and if needed, specify necessary modifications (not before RAN1 #86bis)
For Frame structure type 2: [RAN1, RAN2, RAN4]
  Specify support for a transmission duration based on
    1-slot sTTI for sPDSCH/sPDCCH/sPUSCH/sPUCCH
  Study any impact on CSI feedback and processing time, and if needed, specify necessary modifications (not before RAN1 #86bis)

In the previous RAN1 meeting #89 in Hangzhou, China, discussion related to UE capability with respect to data reception took place, triggered by contribution 3GPP R1-1709761, "WF on Dynamic Switching from PDSCH Scheduling to sPDSCH Scheduling" by Qualcomm, Samsung, and Intel. Consequently, the following working assumption was made:

Working Assumption:
  In case of dynamic switching from PDSCH scheduling within subframes n−X to n−1 to sPDSCH scheduling in subframe n over a given carrier, if UE's maximum processing capability is violated due to a need for decoding the sPDSCH received within a given subframe, a UE may stop processing the PDSCHs received during the past X subframes.
  The value of X is defined as a UE capability, and take a value between 0 to k−1, where k is the time between PDSCH reception and the associated feedback
  A UE should provide HARQ ACK/NAK feedback for the PDSCHs where processing has been stopped.
  For further study how maximum processing capability is defined
  To be confirmed by RAN1 #90

The working assumption above leaves open the definition of maximum processing capability, as well as the mechanism to indicate the capability to the eNodeB.

As discussed in TDoc 3GPP R1-1708765, "Aspects related to dynamic switching between 1 ms TTI and sTTI" by Qualcomm, from the UE implementation point of view, the processing of a unicast PDSCH received in subframe n is completed during the next few subframes. Because of this, the received subframes should be pipelined and processed so that each received PDSCH can meet its HARQ reporting timeline (that is, the time by which the eNB expects ACK/NACK from the UE). Further, it is guaranteed that at each given time, the rate of the data being processed at the UE and/or the number of RBs that can be handled at a UE are within the UE's defined limits. Hence, each PDSCH can be sent with the maximum allowable MCS and RB allocation for a given user.

FIG. 1 illustrates an example of a typical conventional PDSCH processing scenario, where the HARQ-ACK for PDSCH transport block(s) subframe n is transmitted in subframe n+4. In the top row, the transmission of the subframes in the downlink is shown, wherein each of the subframes correspond to a TTI (1 ms). In the lower row, the HARQ ACK/NACK in the uplink is shown. In the example of FIG. 1, the HARQ ACK/NACK of the downlink subframe n is sent in uplink subframe n+4 (etc. for the other subframes).

Therefore, between subframe n and n+4, the UE will in parallel
  process fully the PDSCH scheduled in subframe n, process 3/4, 2/4 and 1/4 of PDSCH scheduled in subframes n+1, n+2, and n+3, and process 3/4, 2/4 and 1/4 of PDSCH scheduled before subframe n (but for which HARQ-Ack not transmitted yet)—such as PDSCH of subframes n−1, n−2 and n−3.

Therefore, on average, the UE needs to process, full 4 PDSCH in 4 subframes, i.e. one full PDSCH per subframe, i.e. 4 times ¼th of PDSCH in case of n+4 HARQ-ACK timing.

When sTTI operation is allowed, handling the processing of two unicast PDSCHs with different TTI lengths and/or different HARQ-ACK timing becomes a challenging task. In particular, the sTTI operation has a tight HARQ-ACK feedback timing; the sPDSCH processing should be started as soon as possible, and cannot be pipelined similar to the conventional 1 ms PDSCHs. In essence, the UE might need to perform more processing (computations) during a given time unit than with 1-ms TTI.

The term 1 ms PDSCH means a physical downlink shared channel transmitted over conventional 1 ms TTI. The duration of the TTI is 1 ms, same as that of a subframe. Every TTI, the scheduler in the eNB allocates PRB(s) to the users. Each subframe has 2 slots, carrying 7 symbols (or 6 symbols in case of extended cyclic prefix) each. Correspondingly, sPDSCH means a physical downlink shared channel transmitted over a sTTI. A sTTI may carry 2 symbols, 3 symbols, or 7 symbols. In the latter case, the sTTI is a slot of the subframe. A corresponding explanation applies to the downlink control channel such as (s)PDCCH.

FIG. 2 illustrates the problem upon transition from 1-ms PDSCH transmissions to sTTI/sPDSCH transmissions. FIG. 2 corresponds to FIG. 1, except that in subframes n+1, n+2, n+3 etc. sTTIs carrying sPDSCH are sent (shown below the respective downlink subframes). While the HARQ-ACK time for the TTIs in subframes until subframe n is the same as in FIG. 1 (4 subframes), sTTIs have a shorter HARQ-ACK time (here 1 subframe). In this example the UE will need to process between subframe n and subframe n+4:

process fully the PDSCH in subframe n, and process 3/4, 2/4 and 1/4 of the PDSCHs in subframes n−1, n−2, and n−3 process fully 12 sPDSCHs scheduled in subframe n+1 and n+2, and process 6/6, 5/6 . . . 1/6 of the sPDSCHs scheduled in subframe n+3

The example of FIG. 2 demonstrates how processing load increases, when a UE is scheduled with continuous 1 ms TTI PDSCH flow and starts to be scheduled with continuous sTTI sPDSCHs instead. A UE has to process equivalent of 5-6 PDSCHs in 4 subframes instead. To better illustrate the processing load at the UE, an example of processing load per sTTI is shown in FIG. 3, which demonstrates how many bits (symbols) are processed instantaneously at a time-grid of a sTTI granularity. In the example 2-symbol sTTI are used, meaning that 6 sTTIs correspond to one 1 ms TTI. In this example, up to time stamp '0' the 1 ms TTI PDSCHs are scheduled followed by continuous 2-symbol sTTI sPDSCH scheduling. When 1 ms TTI PDSCHs are scheduled, the processing load is according to the nominal (legacy) 1 ms TTI PDSCH processing load which is shown as value 1. However, when sTTI sPDSCHs start to be scheduled, the previous 1 ms TTIs PDSCH are still processed, while sTTI sPDSCHs take more instantaneous processing power due to tighter HARQ-ACK feedback times (which is assumed to have a n+6 relation in number of sTTIs in this example). As a consequence, the instantaneous processing load reaches 1.75× the nominal processing load (i.e. the processing load required with continuous scheduling of 1-ms TTIs/PDSCHs), before previously processed TTI PDSCHs start to be ready/processed and acknowledged. After that the processing load returns to 1 when only sTTI DL data (i.e. sPDSCH) needs to be processed and the overlap of processing of 1 ms PDSCH and sTTI sPDSCH is not required any longer. To have the same nominal processing requirement for 1 ms TTI PDSCH and sTTI sPDSCH in this example, we assume the TTI PDSCH and sTTI sPDSCH are scheduled at DL peak rate and TTI and sTTI are having the same DL peak data rate.

As a consequence, the UE will clearly need to perform more computation in PDSCH-sPDSCH transitions than it otherwise would, e.g. in the cases of continuous PDSCH-only, or sPDSCH-only scheduling, as shown in above example.

In Qualcomm's TDoc 3GPP R1-1708765, the same issue of having to process still pending 1 ms TTI PDSCH data and sTTI sPDSCH data to process is explained, as also shown above. For easier referencing, some parts of their contribution are copied here:

Dynamic Scheduling of 1 ms TTI and sTTI

As mentioned in Section 1, in RAN1 #87, it was decided to define the UE behaviour in terms of decoding the 1 ms and sTTI traffics based on the UE capability. When scheduled over a subframe of a given carrier, if a UE is capable, then it must decode both unicast PSDCH and sPSDCH. Otherwise, the UE is not required to decode the unicast PDSCH.

From the UE implementation point of view, the processing of a unicast PDSCH received in subframe n is completed during the next few subframes. For this reason, the received subframes should be properly pipelined and processed so that each received PDSCH can meet its HARQ timeline. Further, it is guaranteed that at each given time, the rate of the data being processed at the UE and/or the number of RBs that can be handled at a UE are within the UE's defined limits. Hence, each PDSCH can be sent with the maximum allowable MCS and RB allocation for a given user. An illustrative example is shown in FIG. 4A for 1 ms PDSCH with n+4 HARQ processing timing.

When the sTTI operation is allowed, handling the processing of two unicast PDSCHs with different TTI lengths becomes a challenging task. In particular, the sTTI operation has a tight turnaround time; the sPDSCH processing should be started as soon as possible, and cannot be pipelined similar to the 1 ms PDSCHs. An illustrative example is shown in FIG. 4B for a UE that is capable of decoding both PDSCH and sPDSCH in the same subframe and over the same cell.

In this example, consider a maximum TBS and/or RB allocation for 1 ms PDSCH over subframes n−2 and n−1. A UE receives both PDSCH and sPDSCH over subframe n and needs to decode both. However, assume that the processing of the sTTI overlaps with the processing of PDSCH sent in subframe n−1. Unless a UE has a double capability to handle both sPDSCH and PDSCH separately, it cannot decode both PDSCH and sPDSCH.

Next, consider the case where a UE is not capable of decoding both sTTI and 1 ms TTI sent in subframe n. According to the agreement, it is required to decode sTTI and discard the PDSCH. However, similar to the case shown above, since the sTTI processing may collide with the PDSCH processing sent earlier, even sTTI decoding alone cannot be done.

One plausible solution for this issue is to define an exclusion window of length Xms. Then, if an sTTI is scheduled over subframe n, the processing of all PDSCHs within the window will be discontinued. One issue with this solution is that it may degrade the 1 ms LTE performance. However, it should be noted that switching from 1 ms TTI to sTTI is not expected to happen so often. Further, to tackle this issue, the length of the exclusion window could be a UE capability. As an example, it may be as small as 1 ms for some users to 3 ms for other users. In addition, the maximum window length is dependent on the processing timeline as well. In particular, the maximum value of X is 3 ms under the n+4 processing timeline, whereas it is 2 ms under the n+3 processing timeline.

Proposal 2: When an sPDSCH is scheduled, all the previous PDSCHs scheduled within the past X subframes of a given carrier should be dropped at a UE. The value of X could be dependent on the processing timeline as well as a UE capability.

Moreover, the following proposals are made in 3GPP R1-1709761 by Qualcomm based on the TDoc mentioned above:

In case of dynamic switching from PDSCH scheduling to sPDSCH scheduling over a given carrier, if UE's maximum processing capability is violated due to a need for decoding the sPDSCH received within a given subframe, a UE should drop the PDSCHs received during the past X subframes.

The value of X is defined as a UE capability, and take a value between 1 to k−1, where k is from n+k (i.e., 1 ms TTI processing timing.)

A UE should provide HARQ ACK/NAK feedback for the dropped PDSCHs.

SUMMARY OF THE INVENTION

It is an object of the present invention to improve the prior art.

According to a first aspect of the invention, there is provided an apparatus, comprising at least one processor, at least one memory including computer program code, and the at least one processor, with the at least one memory and the computer program code, being arranged to cause the apparatus to at least perform estimating a future instantaneously required processing effort required by a terminal to process symbols received in at least one first transmission time interval and at least one second transmission time interval; checking if the estimated future instantaneously required processing effort exceeds a capability of the terminal to process the symbols; modifying a future scheduling of the symbols for the terminal if the future instantaneously required processing effort exceeds the capability; wherein each of the first transmission time intervals comprises not more than a first maximum possible number of the symbols; each of the second transmission time intervals comprises not more than a second maximum possible number of the symbols; and at least one of: the first maximum possible number is larger than the second maximum possible number, and a second processing interval required to finalize the processing of the respective symbols of each of the second transmission time intervals is shorter than a first processing interval required to finalize the processing of the respective symbols of each of the first transmission time intervals.

If the first maximum possible number is larger than the second maximum possible number, a scaling factor may indicate a ratio of a second processing requirement required by the terminal to process the symbols of one of the second transmission time intervals to a first processing requirement required by the terminal to process the symbols of one of the first transmission time intervals; and the estimating of the future instantaneously required processing effort may be based on the scaling factor.

A first delay may indicate how long a start of the processing of the symbols of each of the first transmission time intervals after the respective first transmission time interval is delayed by the terminal; a second delay may indicate how long a start of the processing of the symbols of each of the second transmission time intervals after the respective second transmission time interval is delayed by the terminal; and the estimating of the maximum required processing effort may be based on the respective at least one of the first delay and the second delay.

The estimating may comprise calculating the future instantaneously required processing effort $\Psi$ at a time of an $i^{th}$ second transmission time interval sTTI i based on the following pseudo-code:

If PDSCH is scheduled in sTTI i for the terminal $$\Psi(i+\delta_{TTI}:i+K_{TTI}+\delta_{TTI}) = \Psi(i+\delta_{TTI}:i+K_{TTI}+\delta_{TTI}) + \frac{\Pi_{TTI}}{K_{TTI}}K_{sTTI}$$

$$i = i + N_{sTTI}$$

If sPDSCH is scheduled in sTTI i for the terminal $$\Psi(i+\delta_{sTTI}:i+K_{TTI}+\delta_{sTTI}) = \Psi(i+\delta_{TTI}:i+K_{TTI}+\delta_{TTI}) + \rho\frac{\Pi_{sTTI}}{K_{sTTI}}$$

$$i = i + 1$$

If nothing is scheduled in sTTI i for the terminal
   i=i+1 sPDSCH denotes symbols of the symbols scheduled in any of the second transmission time intervals;

PDSCH denotes symbols of the symbols scheduled in any of the first transmission time intervals;

$N_{sTTI}$ is a ratio of the first maximum possible number to the second maximum possible number;

$K_{TTI}$ is a first processing interval for processing the symbols of one of the first transmission time intervals in number of the second transmission time intervals;

$K_{sTTI}$ is a second processing interval for processing the symbols of the second transmission time interval in number of second transmission time intervals;

$\Pi_{TTI}$ is an instantaneous processing requirement for the processing of scheduled PDSCH of the first transmission time intervals normalized by the maximum possible instantaneous processing requirement for the processing of any scheduled PDSCH of the first transmission time intervals;

$\Pi_{sTTI}$ is an instantaneous processing requirement for the processing of scheduled sPDSCH of the second transmission time intervals normalized by the maximum possible instantaneous processing requirement for the processing of any scheduled PDSCH of the first transmission time intervals;

$\rho$ is a scaling factor indicating a ratio of a second processing requirement required by the terminal to process the symbols of one of the second transmission time intervals to a first processing requirement required by the terminal to process the symbols of one of the first transmission time intervals;

$\delta_{TTI}$ is a first delay indicating how long a start of the processing of the symbols of each of the first transmission time intervals after the respective first transmission time interval is delayed by the terminal;

$\delta_{sTTI}$ is a second delay indicating how long a start of the processing of the symbols of each of the second transmission time intervals after the respective second transmission time interval is delayed by the terminal.

The at least one processor, with the at least one memory and the computer program code, may be arranged to cause the apparatus to further perform instructing to schedule the symbols for the terminal into at least one of one or more first transmission time intervals and one or more second transmission time intervals if the estimated future instantaneously required processing effort does not exceed the capability.

If the terminal is capable to receive the symbols over plural aggregated carriers, the at least one processor, with the at least one memory and the computer program code, may be arranged to cause the apparatus to further perform the estimating, checking, and inhibiting separately for each of the carriers.

If the terminal is capable to receive the symbols over plural aggregated carriers, the at least one processor, with the at least one memory and the computer program code, may be arranged to cause the apparatus to further perform the estimating, checking, and inhibiting for an aggregated capacity of the carriers.

The at least one processor, with the at least one memory and the computer program code, may be arranged to cause the apparatus to further perform receiving, from the terminal, at least one of an indication of the capability; an indication of the scaling factor; an indication of the first delay; and an indication of the second delay.

The symbols may be scheduled in a sequence of the first transmission time intervals and the second transmission time intervals, at least once in the sequence one of the second transmission time intervals may follow after one of the first transmission time intervals; and the at least one processor, with the at least one memory and the computer program code, may be arranged to cause the apparatus to further perform inhibiting the estimating if the estimating would not include an instantaneous processing requirement to process the symbols of the one of the second transmission time intervals and an instantaneous processing requirement to process the symbols of the one of the first transmission time intervals.

According to a second aspect of the invention, there is provided an apparatus, comprising at least one processor, at least one memory including computer program code, and the at least one processor, with the at least one memory and the computer program code, being arranged to cause the apparatus to at least perform informing a base station on at least one of a capability of a terminal to process symbols received within a predefined time interval in at least one first transmission time interval and at least one second transmission time interval, a scaling factor $\rho$, a first delay $\delta_{TTI}$, and a second delay $\delta_{sTTI}$; wherein each of the first transmission time intervals comprises not more than a first maximum possible number of the symbols; each of the second transmission time intervals comprises not more than a second maximum possible number of the symbols; and at least one of: the first maximum possible number is larger than the second maximum possible number, and a second processing interval required to finalize the processing of the respective symbols of each of the second transmission time intervals is shorter than a first processing interval required to finalize the processing of the respective symbols of each of the second transmission time intervals; the scaling factor $\rho$ indicates a ratio of a second processing requirement required by the terminal to process the symbols of one of the second transmission time intervals to a first processing requirement required by the terminal to process the symbols of one of the first transmission time intervals if the first maximum possible number is larger than the second maximum possible number; the first delay $\delta_{TTI}$ indicates how long a start of the processing of the symbols of each of the first transmission time intervals after the respective first transmission time interval is delayed by the terminal; the second delay $\delta_{sTTI}$ indicates how long a start of the processing of the symbols of each of the second transmission time intervals after the respective second transmission time interval is delayed by the terminal.

The at least one processor, with the at least one memory and the computer program code, may be arranged to cause the apparatus to at least perform calculating an instantaneously required processing effort $\Psi$ at a time of an $i^{th}$ second transmission time interval sTTI i based on the following pseudo-code:

If PDSCH is received in sTTI i by the terminal $$\Psi(i + \delta_{TTI}:i + K_{TTI} + \delta_{TTI}) = \Psi(i + \delta_{TTI}:i + K_{TTI} + \delta_{TTI}) + \frac{\Pi_{TTI}}{K_{TTI}} K_{sTTI}$$

$$i = i + N_{sTTI}$$

If sPDSCH is received in sTTI i by the terminal $$\Psi(i + \delta_{sTTI}:i + K_{TTI} + \delta_{sTTI}) = \Psi(i + \delta_{TTI}:i + K_{TTI} + \delta_{TTI}) + \rho \frac{\Pi_{sTTI}}{K_{sTTI}}$$

$$i = i + 1$$

If nothing is received in sTTI i by the terminal
  i=i+1
checking if the instantaneously required processing effort exceeds the capability;
discarding the processing of the symbols of at least one of the first transmission time intervals if the instantaneously required processing effort exceeds the capability; wherein
  sPDSCH denotes symbols of the symbols received in any of the second transmission time intervals;
  PDSCH denotes symbols of the symbols received in any of the first transmission time intervals;
  $N_{sTTI}$ is a ratio of the first maximum possible number to the second maximum possible number;
  $K_{TTI}$ is a first processing interval for processing the symbols of one of the first transmission time intervals in number of the second transmission time intervals;
  $K_{sTTI}$ is a second processing interval for processing the symbols of the second transmission time interval in number of second transmission time intervals;
  $\Pi_{TTI}$ is an instantaneous processing requirement for the processing of received PDSCH of the first transmission time intervals normalized by the maximum possible instantaneous processing requirement for the processing of any received PDSCH of the first transmission time intervals;
  $\Pi_{TTI}$ is an instantaneous processing requirement for the processing of received sPDSCH of the second transmission time intervals normalized by the maximum possible instantaneous processing requirement for the processing of any received PDSCH of the first transmission time intervals.

The capability of the terminal $\Psi_{UE}$ may fulfill at least one of the following conditions:

$$\Psi_{nom} \leq \Psi_{UE} \leq \Psi_{max}$$

$$\Psi_{nom,sTTI} \leq \Psi_{UE} \leq \Psi_{max}$$

wherein $\Psi_{nom}$ denotes an instantaneously required processing effort to process the symbols if the symbols are received only in first transmission time intervals; $\Psi_{nom,sTTI}$ denotes an instantaneously required processing effort to process the symbols if the symbols are received only in second transmission time intervals; and $\Psi_{max}$ denotes a maximum instantaneously required processing effort to process the symbols if, after the symbols are received only in first transmission time intervals, the symbols are received only in second transmission time intervals.

The maximum required processing effort $\Psi_{max}$ may be estimated based on the following formulas:

$$\Psi_{max} = \frac{\alpha_{TTI} n_{TTI,max} + \rho \Pi_{sTTI,max}}{\Pi_{TTI,max}}$$

$$\alpha_{TTI} = \frac{K_{TTI} - N_{sTTI}}{K_{TTI}}.$$

The at least one processor, with the at least one memory and the computer program code, may be arranged to cause the apparatus to further perform normalizing the capability by one of $\Psi_{nom}$, $\Psi_{nom,sTTI}$, and $\Psi_{max}$ to obtain a normalized capability, wherein the base station may be informed on the normalized capability; $\Psi_{nom}$ denotes a maximum instantaneously required processing effort to process the symbols if the symbols are received only in first transmission time intervals; $\Psi_{nom,sTTI}$ denotes a maximum instantaneously required processing effort to process the symbols if the symbols are received only in second transmission time intervals; and $\Psi_{max}$ denotes a maximum instantaneously required processing effort to process the symbols if, after the symbols are received only in first transmission time intervals, the symbols are received only in second transmission time intervals.

The at least one processor, with the at least one memory and the computer program code, may be arranged to cause the apparatus to further perform calculating an excess capability based on the capability, $\Psi_{max}$, and one of $\Psi_{nom}$ and $\Psi_{nom,sTTI}$, wherein the excess capability is 0% if the capability is the one of $\Psi_{nom}$ and $\Psi_{nom,sTTI}$, the excess capability is 100% if the capability is $\Psi_{max}$, the excess capability is calculated by linear interpolation between the one of $\Psi_{nom}$ and $\Psi_{nom,sTTI}$ and $\Psi_{max}$ if the capability is between the one of $\Psi_{nom}$ and $\Psi_{nom,sTTI}$ and $\Psi_{max}$, the base station may be informed on the excess capability; $\Psi_{nom}$ denotes a maximum instantaneously required processing effort to process the symbols if the symbols are received only in first transmission time intervals; $\Psi_{nom,sTTI}$ denotes a maximum instantaneously required processing effort to process the symbols if the symbols are received only in second transmission time intervals; and $\Psi_{max}$ denotes a maximum instantaneously required processing effort to process the symbols if, after the symbols are received only in first transmission time intervals, the symbols are received only in second transmission time intervals.

According to a third aspect of the invention, there is provided a method, comprising estimating a future instantaneously required processing effort required by a terminal to process symbols received in at least one first transmission time interval and at least one second transmission time interval; checking if the estimated future instantaneously required processing effort exceeds a capability of the terminal to process the symbols;
modifying a future scheduling of the symbols for the terminal if the future instantaneously required processing effort exceeds the capability; wherein each of the first transmission time intervals comprises not more than a first maximum possible number of the symbols; each of the second transmission time intervals comprises not more than a second maximum possible number of the symbols; and at least one of: the first maximum possible number is larger than the second maximum possible number, and a second processing interval required to finalize the processing of the respective symbols of each of the second transmission time intervals is shorter than a first processing interval required to finalize the processing of the respective symbols of each of the first transmission time intervals.

If the first maximum possible number is larger than the second maximum possible number, a scaling factor may indicate a ratio of a second processing requirement required by the terminal to process the symbols of one of the second transmission time intervals to a first processing requirement required by the terminal to process the symbols of one of the first transmission time intervals; and the estimating of the future instantaneously required processing effort may be based on the scaling factor.

A first delay may indicate how long a start of the processing of the symbols of each of the first transmission time intervals after the respective first transmission time interval is delayed by the terminal; a second delay may indicate how long a start of the processing of the symbols of each of the second transmission time intervals after the respective second transmission time interval is delayed by the terminal; and the estimating of the maximum required processing effort may be based on the respective at least one of the first delay and the second delay.

The estimating may comprise calculating the future instantaneously required processing effort $\Psi$ at a time of an $i^{th}$ second transmission time interval sTTI i based on the following pseudo-code:
If PDSCH is scheduled in sTTI i for the terminal $$\Psi(i+\delta_{TTI}:i+K_{TTI}+\delta_{TTI}) = \Psi(i+\delta_{TTI}:i+K_{TTI}+\delta_{TTI}) + \frac{\Pi_{TTI}}{K_{TTI}} K_{sTTI}$$

$$i = i + N_{sTTI}$$

If sPDSCH is scheduled in sTTI i for the terminal $$\Psi(i+\delta_{sTTI}:i+K_{TTI}+\delta_{sTTI}) = \Psi(i+\delta_{TTI}:i+K_{TTI}+\delta_{TTI}) + \rho \frac{\Pi_{sTTI}}{K_{sTTI}}$$

$$i = i + 1$$

If nothing is scheduled in sTTI i for the terminal
i=i+1
sPDSCH denotes symbols of the symbols scheduled in any of the second transmission time intervals;
PDSCH denotes symbols of the symbols scheduled in any of the first transmission time intervals;
$N_{sTTI}$ is a ratio of the first maximum possible number to the second maximum possible number;
$K_{TTI}$ is a first processing interval for processing the symbols of one of the first transmission time intervals in number of the second transmission time intervals;
$K_{sTTI}$ is a second processing interval for processing the symbols of the second transmission time interval in number of second transmission time intervals;
$\Pi_{TTI}$ is an instantaneous processing requirement for the processing of scheduled PDSCH of the first transmission time intervals normalized by the maximum possible instantaneous processing requirement for the processing of any scheduled PDSCH of the first transmission time intervals;

$\Pi_{sTTI}$ is an instantaneous processing requirement for the processing of scheduled sPDSCH of the second transmission time intervals normalized by the maximum possible instantaneous processing requirement for the processing of any scheduled PDSCH of the first transmission time intervals;

ρ is a scaling factor indicating a ratio of a second processing requirement required by the terminal to process the symbols of one of the second transmission time intervals to a first processing requirement required by the terminal to process the symbols of one of the first transmission time intervals;

$\delta_{TTI}$ is a first delay indicating how long a start of the processing of the symbols of each of the first transmission time intervals after the respective first transmission time interval is delayed by the terminal;

$\delta_{sTTI}$ is a second delay indicating how long a start of the processing of the symbols of each of the second transmission time intervals after the respective second transmission time interval is delayed by the terminal.

The method may further comprise instructing to schedule the symbols for the terminal into at least one of one or more first transmission time intervals and one or more second transmission time intervals if the estimated future instantaneously required processing effort does not exceed the capability.

If the terminal is capable to receive the symbols over plural aggregated carriers, the method may comprise performing the estimating, checking, and inhibiting separately for each of the carriers.

If the terminal is capable to receive the symbols over plural aggregated carriers, the method may comprise performing the estimating, checking, and inhibiting for an aggregated capacity of the carriers.

The method may further comprise receiving, from the terminal, at least one of an indication of the capability; an indication of the scaling factor; an indication of the first delay; and an indication of the second delay.

The symbols may be scheduled in a sequence of the first transmission time intervals and the second transmission time intervals, at least once in the sequence one of the second transmission time intervals may follow after one of the first transmission time intervals; and the method may further comprise inhibiting the estimating if the estimating would not include an instantaneous processing requirement to process the symbols of the one of the second transmission time intervals and an instantaneous processing requirement to process the symbols of the one of the first transmission time intervals.

The method according to the third aspect may be a method of scheduling different types of transmission time intervals.

According to a fourth aspect of the invention, there is provided a method, comprising informing a base station on at least one of a capability of a terminal to process symbols received within a predefined time interval in at least one first transmission time interval and at least one second transmission time interval, a scaling factor ρ, a first delay $\delta_{TTI}$, and a second delay $\delta_{sTTI}$; wherein each of the first transmission time intervals comprises not more than a first maximum possible number of the symbols; each of the second transmission time intervals comprises not more than a second maximum possible number of the symbols; and at least one of: the first maximum possible number is larger than the second maximum possible number, and a second processing interval required to finalize the processing of the respective symbols of each of the second transmission time intervals is shorter than a first processing interval required to finalize the processing of the respective symbols of each of the second transmission time intervals; the scaling factor ρ indicates a ratio of a second processing requirement required by the terminal to process the symbols of one of the second transmission time intervals to a first processing requirement required by the terminal to process the symbols of one of the first transmission time intervals if the first maximum possible number is larger than the second maximum possible number; the first delay $\delta_{TTI}$ indicates how long a start of the processing of the symbols of each of the first transmission time intervals after the respective first transmission time interval is delayed by the terminal; the second delay $\delta_{sTTI}$ indicates how long a start of the processing of the symbols of each of the second transmission time intervals after the respective second transmission time interval is delayed by the terminal.

The method may further comprise calculating an instantaneously required processing effort Ψ at a time of an $i^{th}$ second transmission time interval sTTI i based on the following pseudo-code:

If PDSCH is received in sTTI i by the terminal $$\Psi(i + \delta_{TTI}:i + K_{TTI} + \delta_{TTI}) = \Psi(i + \delta_{TTI}:i + K_{TTI} + \delta_{TTI}) + \frac{\Pi_{TTI}}{K_{TTI}}K_{sTTI}$$

$$i = i + N_{sTTI}$$

If sPDSCH is received in sTTI i by the terminal $$\Psi(i + \delta_{sTTI}:i + K_{TTI} + \delta_{sTTI}) = \Psi(i + \delta_{TTI}:i + K_{TTI} + \delta_{TTI}) + \rho\frac{\Pi_{sTTI}}{K_{sTTI}}$$

$$i = i + 1$$

If nothing is received in sTTI i by the terminal
i=i+1
checking if the instantaneously required processing effort exceeds the capability;
discarding the processing of the symbols of at least one of the first transmission time intervals if the instantaneously required processing effort exceeds the capability; wherein
sPDSCH denotes symbols of the symbols received in any of the second transmission time intervals;
PDSCH denotes symbols of the symbols received in any of the first transmission time intervals;
$N_{sTTI}$ is a ratio of the first maximum possible number to the second maximum possible number;
$K_{TTI}$ is a first processing interval for processing the symbols of one of the first transmission time intervals in number of the second transmission time intervals;
$K_{sTTI}$ is a second processing interval for processing the symbols of the second transmission time interval in number of second transmission time intervals;
$\Pi_{TTI}$ is an instantaneous processing requirement for the processing of received PDSCH of the first transmission time intervals normalized by the maximum possible instantaneous processing requirement for the processing of any received PDSCH of the first transmission time intervals;
$\Pi_{sTTI}$ is an instantaneous processing requirement for the processing of received sPDSCH of the second transmission time intervals normalized by the maximum possible instantaneous processing requirement for the processing of any received PDSCH of the first transmission time intervals.

The capability of the terminal $\Psi_{UE}$ may fulfill at least one of the following conditions:

$$\Psi_{nom} \leq \Psi_{UE} \leq \Psi_{max}$$

$$\Psi_{nom,sTTI} \leq \Psi_{UE} \leq \Psi_{max}$$

wherein $\Psi_{nom}$ denotes an instantaneously required processing effort to process the symbols if the symbols are received only in first transmission time intervals; $\Psi_{nom,sTTI}$ denotes an instantaneously required processing effort to process the symbols if the symbols are received only in second transmission time intervals; and $\Psi_{max}$ denotes a maximum instantaneously required processing effort to process the symbols if, after the symbols are received only in first transmission time intervals, the symbols are received only in second transmission time intervals.

The maximum required processing effort $\Psi_{max}$ may be estimated based on the following formulas:

$$\Psi_{max} = \frac{\alpha_{TTI}\Pi_{TTI,max} + \rho\Pi_{sTTI,max}}{\Pi_{TTI,max}}$$

$$\alpha_{TTI} = \frac{K_{TTI} - N_{sTTI}}{K_{TTI}}.$$

The method may further comprise normalizing the capability by one of $\Psi_{nom}$, $\Psi_{nom,sTTI}$, and $\Psi_{max}$ to obtain a normalized capability, wherein the base station may be informed on the normalized capability; $\Psi_{nom}$ denotes a maximum instantaneously required processing effort to process the symbols if the symbols are received only in first transmission time intervals; $\Psi_{nom,sTTI}$ denotes a maximum instantaneously required processing effort to process the symbols if the symbols are received only in second transmission time intervals; and $\Psi_{max}$ denotes a maximum instantaneously required processing effort to process the symbols if, after the symbols are received only in first transmission time intervals, the symbols are received only in second transmission time intervals.

The method may further comprise calculating an excess capability based on the capability, $\Psi_{max}$, and one of $\Psi_{nom}$ and $\Psi_{nom,sTTI}$, wherein the excess capability is 0% if the capability is the one of $\Psi_{nom}$ and $\Psi_{nom,sTTI}$, the excess capability is 100% if the capability is $\Psi_{max}$, the excess capability is calculated by linear interpolation between the one of $\Psi_{nom}$ and $\Psi_{nom,sTTI}$ and $\Psi_{max}$ if the capability is between the one of $\Psi_{nom}$ and $\Psi_{nom,sTTI}$ and $\Psi_{max}$, the base station may be informed on the excess capability; $\Psi_{nom}$ denotes a maximum instantaneously required processing effort to process the symbols if the symbols are received only in first transmission time intervals; $\Psi_{nom,sTTI}$ denotes a maximum instantaneously required processing effort to process the symbols if the symbols are received only in second transmission time intervals; and $\Psi_{max}$ denotes a maximum instantaneously required processing effort to process the symbols if, after the symbols are received only in first transmission time intervals, the symbols are received only in second transmission time intervals.

The methods according to the fourth aspect may be a method of receiving different types of transmission time intervals.

According to a fifth aspect of the invention, there is provided a computer program product comprising a set of instructions which, when executed on an apparatus, is configured to cause the apparatus to carry out the method according to any of the third and fourth aspects. The computer program product may be embodied as a computer-readable medium or directly loadable into a computer.

According to some embodiments of the invention, at least one of the following advantages may be achieved:
quality of TTI PDSCH transmissions and sTTI sPDSCH transmissions may be improved;
no need to discard DL-SCH bits;
requirements on processing capability to UE may be relaxed.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein:

FIG. 7 shows an apparatus according to an embodiment of the invention;

FIG. 8 shows a method according to an embodiment of the invention;

FIG. 9 shows an apparatus according to an embodiment of the invention;

FIG. 10 shows a method according to an embodiment of the invention;

DETAILED DESCRIPTION OF CERTAIN EMBODIMENTS

Figure 1:
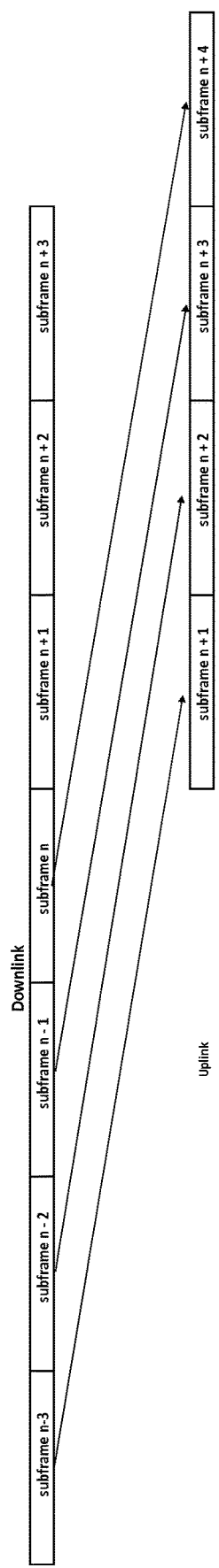
FIG. 1 illustrates an example of a conventional PDSCH processing scenario.
Figure 2:
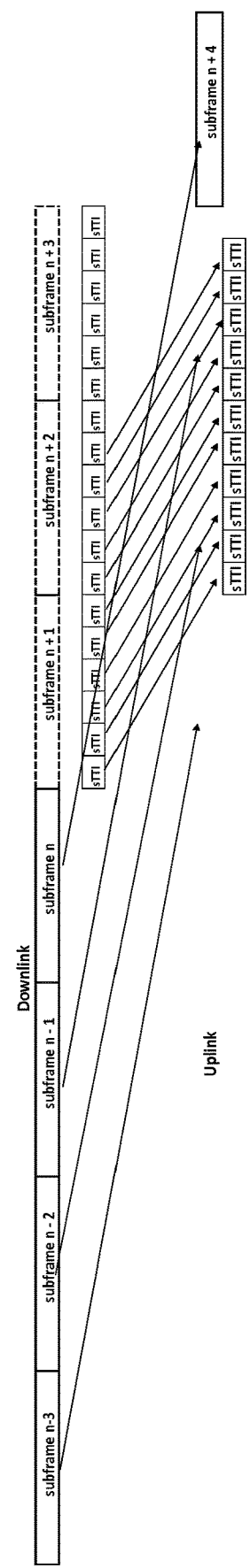
FIG. 2 illustrates an example of a processing scenario, wherein the transmission is switched from PDSCH to sPDSCH.

Herein below, certain embodiments of the present invention are described in detail with reference to the accompanying drawings, wherein the features of the embodiments can be freely combined with each other unless otherwise described. However, it is to be expressly understood that the description of certain embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

According to some embodiments of the invention, the open aspects of the above working assumption based on 3GPP R1-1709761 are tackled and novel and efficient solutions are presented for defining and signalling the UE capability for processing PDSCH and sPDSCH transport blocks when switching from 1-ms TTI PDSCH to 2-symbol, 3-symbol, or 7-symbol sTTI sPDSCH. Namely, some embodiments of the invention provide a UE capability signalling which allows the UE to indicate its ability to process DL data, e.g. in cases when such transitions occur.

Some embodiments of the invention provide a novel scheme for indicating UE capability with regards to simultaneous processing of PDSCH and sPDSCH transport blocks. The scheme for indicating UE capability is based on the following definitions:

The nominal processing capability ($\Psi_{nom}$) being the DL-SCH processing capability of a given TTI-length, i.e. TTI PDSCH and sTTI sPDSCH. For example, a $\Psi_{nom}$ of legacy TTI is $\frac{1}{4}^{th}$ of maximum number of DL transport channel bits on a carrier in a subframe. $\Psi_{nom}$ may be defined such that it is normalized with respect to e.g.
- a maximum number of DL transport channel/shared channel bits, i.e. 2× the max TBS size for 1 ms TTI per subframe, or 2×6 the max TBS size for 2 symbol sTTI in a subframe (as 2 transport blocks per sTTI and at maximum six 2 symbol sTTIs per 1 ms TTI/subframe)
- a maximum number PRBs scheduled on a carrier, e.g. 100 PRBs
- normalized to "1" (e.g. as shown in the example above for a certain maximum number of PDSCH bits per TTI on a carrier)

The maximum processing effort ($\Psi_{max}$) in a subframe/sTTI, which is the maximum amount of processing that the UE might in principle need to do in a subframe/sTTI without dropping any of previously scheduled PDSCH or sPDSCH scheduled with peak data rate. This depends on $\Psi_{nom}$ of TTI PDSCH and $\Psi_{nom,sTTI}$ of sTTI sPDSCH, and can be expressed as $$\Psi_{max} = \frac{\Psi_{nom,sTTI} + \alpha_{TTI}\Psi_{nom}}{\Psi_{nom}}$$

where, $\alpha_{TTI}$ depends on the HARQ timing of TTI and sTTI.

A UE's capability $\Psi_{UE}$ is defined as a value between $\Psi_{nom}$ and $\Psi_{max}$, including these limits.

According to some embodiments of the invention, the UE checks if the instantaneously required processing effort $\Psi$ due to the scheduling by the eNodeB (given by the exemplary calculations below) exceeds the UEs supported processing capability $\Psi_{UE}$. In some of these embodiments, once the required UE processing effort based on eNodeB scheduling $\Psi$ exceeds the supported processing capability $\Psi_{UE}$, the UE may stop processing the latest scheduled PDSCH TTIs and report a "NACK" for those.

According to some embodiments of the invention, the eNB may take the UE supported processing capability into account in its sTTI/sPDSCH scheduling decisions to prevent the case that the UE needs to stop processing some PDSCH (by using the same calculations of the UE's instantaneously required processing effort $\Psi$, which eNB may use to estimate a future instantaneously required processing effort for a case that the eNB indeed schedules as foreseen).

In case the UE capability as well as the processing effort calculations are done jointly over all the configured component carriers (i.e. aggregated over the CC), the UE should first stop processing the latest scheduled PDSCH transport blocks of the CC with the highest carrier indicator field number (i.e. the stop decoding/dropping should be first done in the CC domain with decreasing CC index, followed by the time domain if needed).

According to some embodiments of the invention, a model of (future) instantaneously required processing effort at UE is defined, such that an eNB may predict the processing effort by cumulating processing requirements given the past scheduled TTI PDSCHs and sTTI sPDSCH and in the future potentially-scheduled sTTI sPDSCHs and TTI PDSCHs. In the present document, the term "processing requirement" denotes the instantaneously required processing power to process a single TTI or sTTI, while the term "processing effort" denotes the instantaneously required processing power resulting from simultaneously processing one or more TTIs and sTTIs (i.e. an accumulation of the processing power needed to process the one or more TTIs and sTTIs).

The (future) instantaneously required processing effort $\Psi(i)$, at sTTI i can be expressed by the following pseudo-code:

Switch the following:
If PDSCH is scheduled in sTTI i for a UE $$\Psi(i+\delta_{TTI}:i+K_{TTI}+\delta_{TTI}) = \Psi(i+\delta_{TTI}:i+K_{TTI}+\delta_{TTI}) + \frac{\Pi_{TTI}}{K_{TTI}}K_{sTTI}$$

$$i = i + N_{sTTI}$$

If sPDSCH is scheduled in sTTI i for a UE $$\Psi(i+\delta_{sTTI}:i+K_{TTI}+\delta_{sTTI}) = \Psi(i+\delta_{TTI}:i+K_{TTI}+\delta_{TTI}) + \rho\frac{\Pi_{sTTI}}{K_{sTTI}}$$

$$i = i + 1$$

If nothing is scheduled in sTTI i for a UE
i=i+1
where
$N_{sTTI}$ number of sTTIs in a subframe, $N_{sTTI}$=6 for 2-symbol sTTI and $N_{sTTI}$=2 for 1-slot sTTI in RAN1 specification
$K_{TTI}$ is processing interval of TTI in number of sTTIs
i.e. for n+4 processing time for 1 ms TTI and six 2-symbol sTTIs per TTI, $K_{TTI}$=4*$N_{sTTI}$=24 sTTIs
$K_{sTTI}$ is processing interval of sTTI in sTTIs
i.e. for n+4 or n+6 minimum HARQ-Ack timing, $K_{sTTI}$=4 or $K_{sTTI}$=6 respectively
$\Pi_{sTTI}$ is the normalized actual processing requirement for sTTI—e.g. the scheduled sTTI sPDSCH bits per 1 ms TTI normalized by the maximum DL-SCH bits per TTI (an example)
$\Pi_{TTI}$ is the normalized actual processing requirement for TTI—e.g. the scheduled TTI PDSCH bits per 1 ms TTI normalized by the maximum DL-SCH bits per TTI (an example)
ρ is scaling factor of nominal sTTI processing requirement with respect to TTI PDSCH nominal processing requirement (i.e., typically ρ>1 indicating higher processing requirement needed for sTTI sPDSCH compared to TTI PDSCH of the same DL-SCH peak data rate)
$\delta_{sTTI}$ postpone start of processing of sTTI in sTTI
$\delta_{TTI}$ postpone start of processing of TTI in sTTI The above can be illustrated on several examples below, with the scheduling pattern of continuous 1 ms TTI scheduling followed at time instance 0 with continuous sPDSCH scheduling, and the following settings of parameters:

$K_{TTI}$=24 (i.e. 6 2-symbol sTTIs per TTI, n+4 assumption for TTI processing)

$K_{sTTI}$=6 (i.e. n+6 assumption for 2-symbol sTTI)

$\Pi_{TTI}$=$\Pi_{TTI,max}$=1 (assuming the UE scheduled with DL-SCH peak data rate for 1 ms TTI)

$\Pi_{sTTI}$=$\Pi_{sTTI,max}$=[0.5 1] (assuming the UE scheduled with DL-SCH peak data rate for sTTI, DL-SCH peak data rate for sTTI being either ½ or equal the peak data rate of 1 ms TTI)

ρ=[1, 1.5, 2, 3]

$\delta_{sTTI}$=0

$\delta_{TTI}$=0

$N_{sTTI}$=6 (2-symbol sTTI assumed)

Figure 3:
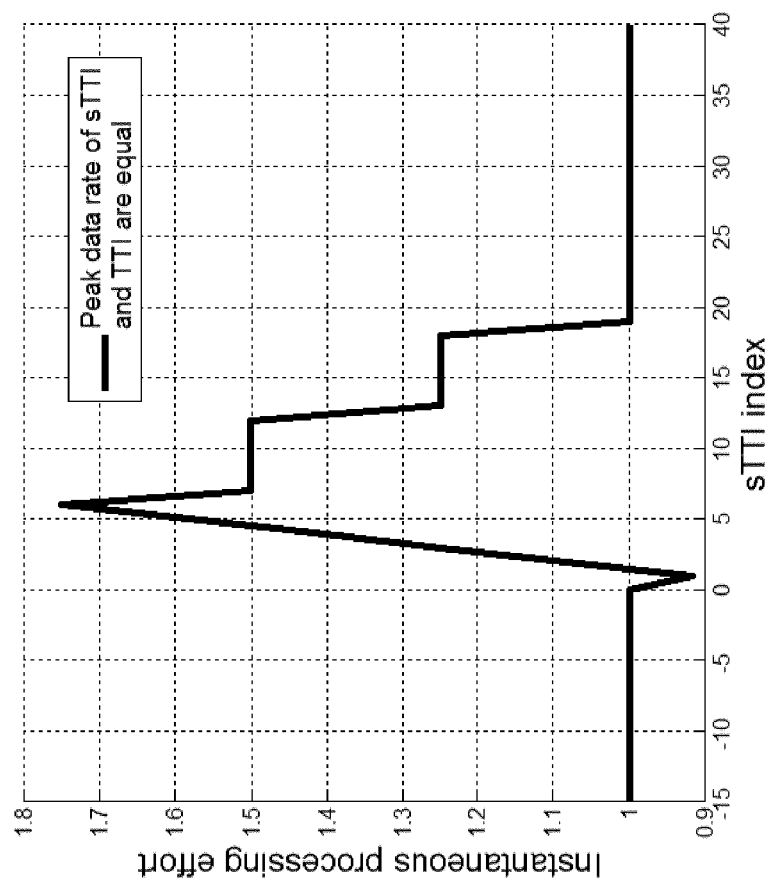
FIG. 3 shows an example of a processing load per sTTI at the UE when TTI switches to sTTI.
Figure 4A:
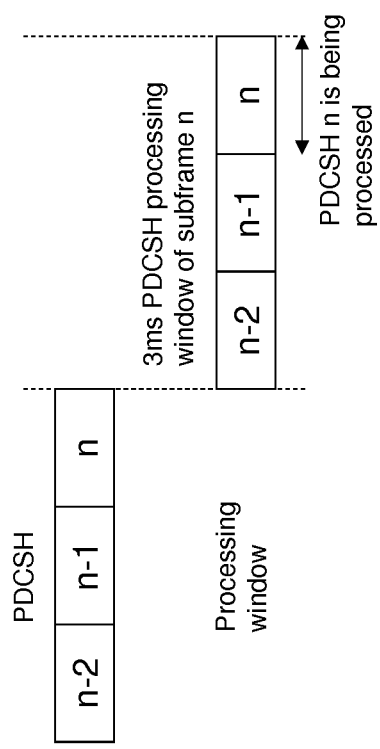
FIGS. 4A and 4B are taken from 3GPP R1-1708765 and correspond to FIGS. 1 and 2, respectively.
Figure 4B:
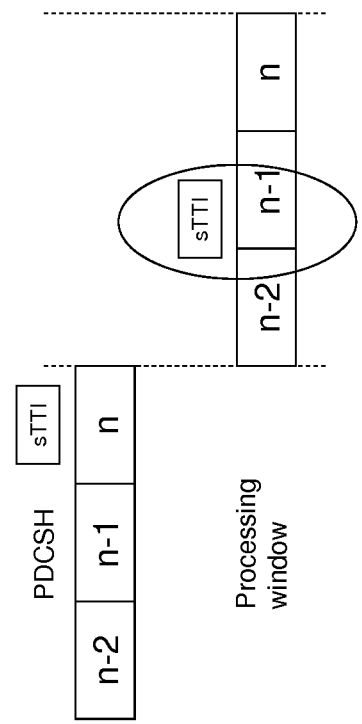
Figure 5:
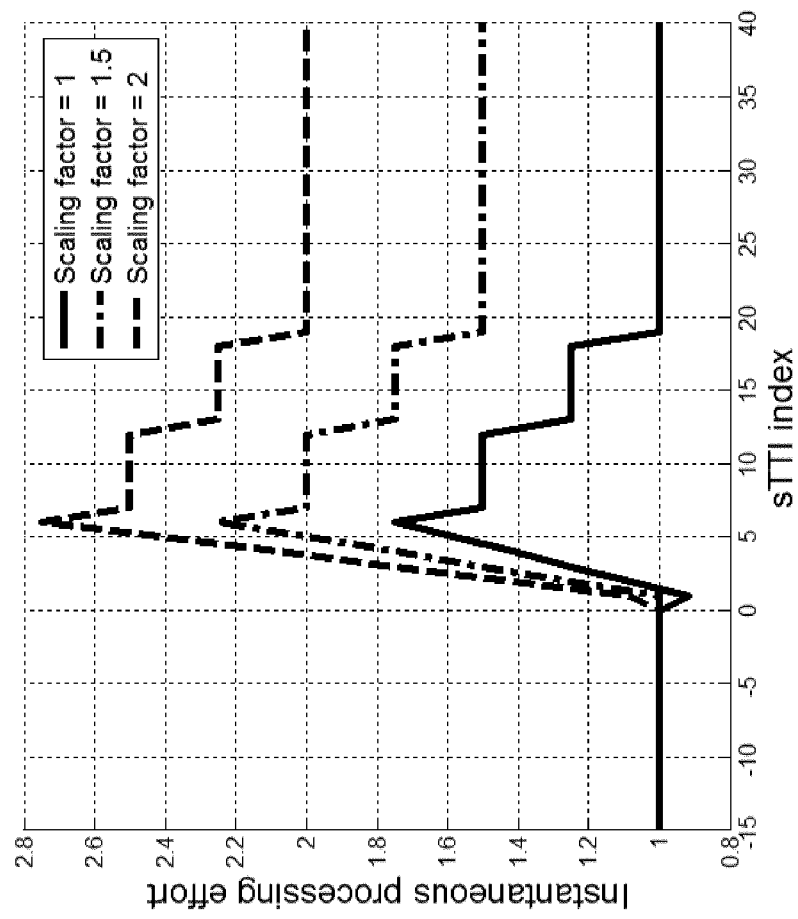
FIG. 5 shows an example of a processing load at the UE when TTI switches to sTTI.

FIG. 5 illustrates the (future) instantaneously required processing effort when the DL-SCH peak data rate using TTI PDSCH is the same as DL-SCH peak data rate of sTTI PDSCH (e.g. the same transmission rank for sTTI sPDSCH and TTI PDSCH, $\Pi_{TTI}$=$\Pi_{sTTI}$=$\Pi_{TTI,max}$=1), for different scaling factors ρ=[1, 1.5, 2] (with different line styles). The axes correspond to those of FIG. 3.

Figure 6:
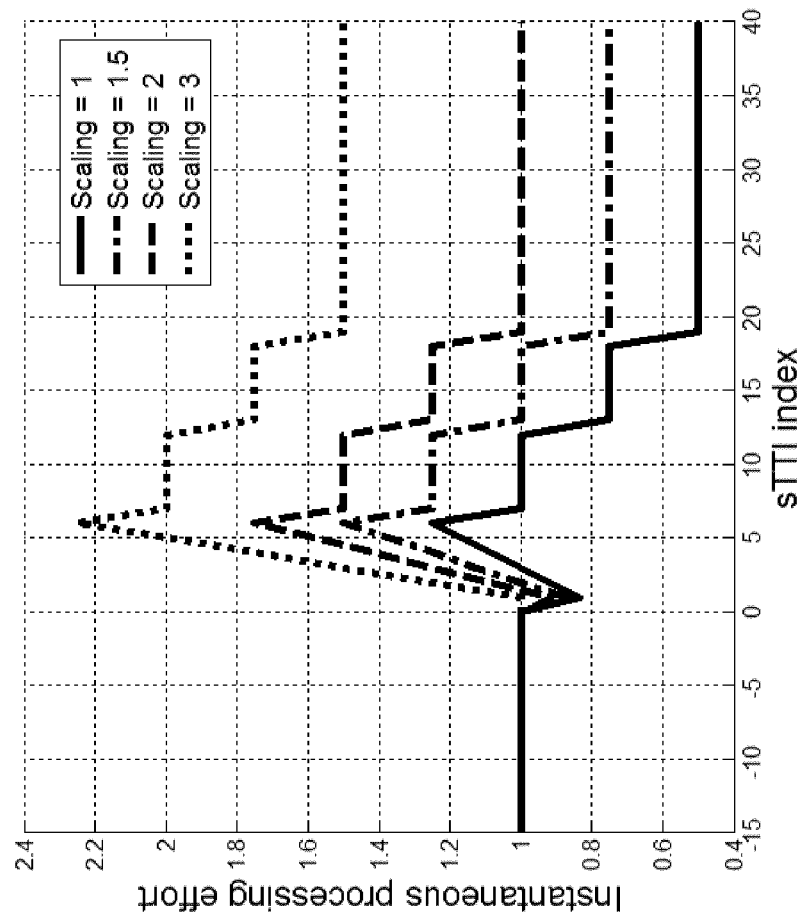
FIG. 6 shows an example of a processing load at the UE when TTI switches to sTTI.

FIG. 6 illustrates the (future) instantaneously required processing effort when DL-SCH peak data rate for 1 ms TTI PDSCH is twice the DL-SCH peak data rate of sTTI sPDSCH (e.g. the TTI PDSCH is supported with 8 MIMO layers and sTTI sPDSCH with 4 MIMO layers only, i.e. $\Pi_{TTI}$=$\Pi_{TTI,max}$ and $\Pi_{sTTI}$=0.5*$\Pi_{TTI,max}$), for different scaling factors ρ=[1, 1.5, 2, 3] (with different line styles). The axes correspond to those of FIG. 3.

For the above described model, the maximum processing effort is $$\Psi_{max} = \frac{\alpha_{TTI}\Pi_{TTI,max} + \rho\Pi_{sTTI,max}}{\Pi_{TTI,max}},$$

where $$\alpha_{TTI} = \frac{K_{TTI} - N_{sTTI}}{K_{TTI}}$$

being a consequence of HARQ timings and TTI lengths. And the nominal processing effort $\Psi_{nom}$=$\Pi_{TTI,max}$=1, defined with respect to 1 ms TTI PDSCH maximum processing requirement only (i.e. only PDSCH processing needed). The parameter ρ, scaling the nominal processing requirement of sTTI sPDSCH, takes into account that processing of sPDSCH may be more challenging than processing of PDSCH, and hence a scaling factor may be introduced for the calculation of maximum processing requirement related to sTTIs as noted in the formula below as well as when considering the nominal processing effort for sTTI $\Psi_{nom,sTTI}$=ρ*$\Pi_{sTTI,max}$/$\Pi_{TTI,max}$.

According to some embodiments of the invention, the UE indicates the processing capability $\Psi_{UE}$ that the UE supports. Upon indicating its capabilities for short TTI operation, the UE will also indicate its processing capability, which will be somewhere in the range of:

$\Psi_{nom} \leq \Psi_{UE} \leq \Psi_{max}$ $\Psi_{nom,sTTI} \leq \Psi_{UE} \leq \Psi_{max}$ The two lower bounds in here are given by the fact, that the UE needs to at least support continuous PDSCH only scheduling (i.e. capability given by $\Psi_{nom}$) as well as continuous sPDSCH scheduling only (i.e. capability given by $\Psi_{nom,sTTI}$). The upper bound is just given by the fact, that the peak processing need for the UE when switching from continuous PDSCH scheduling to continuous sPDSCH scheduling is given by $\Psi_{max}$.

According to some embodiments of the invention, the calculating of the (future) instantaneously required processing effort is performed only if the processing requirements to process the symbols of a first transmission time interval (e.g. TTI) and a second transmission time interval (e.g. sTTI) are included, wherein the second transmission time interval follows the first transmission time interval. The second transmission time interval may follow the first transmission time interval, or one or more empty time intervals may be interposed.

$N_{sTTI}$, $K_{TTI}$, $K_{sTTI}$, $\Pi_{sTTI}$, $\Pi_{TTI}$ are known to eNB and UE. Hence, UE needs to inform eNB only on its processing capability $\Psi_{UE}$, the scaling factor ρ, and the delays $\delta_{TTI}$ and $\delta_{sTTI}$ such that eNB may calculate if a future instantaneously required processing effort due to a certain scheduling exceeds the processing capability of the UE. If the processing capability of the UE is exceeded, the eNB may reconsider the scheduling decisions. E.g. it may not schedule TTI PDSCH before switching to sTTI sPDSCH or alternatively it may not schedule too many consecutive sTTI sPDSCH after switching from DL TTI to DL sTTI operation. Or it can consider to exceed the processing capability if scheduling the sPDSCH sTTI is higher importance compared to losing the previously scheduled PDSCH TTI.

In some embodiments of the invention, at least one of the scaling factor ρ, and the delays $\delta_{TTI}$ and $\delta_{sTTI}$ may be predefined (a respective default value, e.g. defined by a standard such as 3GPP). In this case, UE need not to inform eNB on these values.

In some embodiments, a minimum UE processing capability $\Psi_{UEmin}$ may be predefined, e.g. by a standard such as 3GPP. That is, if a UE is capable of processing both TTI and sTTI, it has to provide at least the minimum processing capability $\Psi_{UEmin}$. In these embodiments, UE does not need to inform eNB on its processing capability. If UE informs eNB that it has a higher processing capability than $\Psi_{UEmin}$, eNB may take the higher processing capability into account when performing scheduling.

For the carrier aggregation case, the overall processing the UE is able to do may be considered jointly. Just as an example here, when having a certain UE capability on the maximum number of PDSCH bits per TTI (incl. the carrier aggregation capabilities), a UE supporting, as an example, 4 carriers would have a capability of '4' compared to the processing effort calculation above. Therefore, in principle for such a UE either a higher capability is defined (if the processing capabilities in the UE can be allocated dynamically between carriers)—or, even for a CA capable UE, the capability consideration needs to be done per CC (and not aggregated). In case the processing capability is defined jointly (or aggregated over all the supported component carriers), one might need to consider that the UE might not support DL sTTI operation on as many DL CCs as (legacy) 1 ms TTI. Therefore, the relation of $\Psi_{nom}$/$\Psi_{nom,sTTI}$ based on a single carrier may be larger than the joint capability relation between 1 ms TTI and sTTI $\Psi_{nom,CA}$/$\Psi_{nom,sTTI,CA}$ just due to the fact of supporting more 1 ms TTI DL CC than sTTI DL CCs.

FIG. 7 shows an apparatus according to an embodiment of the invention. The apparatus may be a base station such as a eNB, or an element thereof. FIG. 8 shows a method according to an embodiment of the invention. The apparatus according to FIG. 7 may perform the method of FIG. 8 but is not limited to this method. The method of FIG. 8 may be performed by the apparatus of FIG. 7 but is not limited to being performed by this apparatus.

The apparatus comprises estimating means 10, checking means 20, and modifying means 30. Each of the estimating means 10, checking means 20, and modifying means 30 may be an estimator, checker, and modifier, respectively. Each of the estimating means 10, checking means 20, and modifying means 30 may be an estimating processor, checking processor, and modifying processor, respectively.

The estimating means 10 estimates a future instantaneously required processing effort (S10). The instantaneously required processing effort is required to process DL-SCH symbols of scheduled one or more first transmission time intervals and scheduled one or more second transmission time intervals. Each of the first transmission time intervals comprises not more than a first maximum number of the symbols (e.g. TTI of 14 symbols). Each of the second transmission time intervals comprises not more than a second maximum number of the symbols (e.g. sTTI of 2, 3, or 7 symbols). The time for transmitting one of the symbols may be the same for the symbols of the first transmission time interval and the symbols of the second transmission time interval.

The first maximum possible number is larger than the second maximum possible number, and/or a second processing interval required to finalize the processing of the respective symbols of each of the second transmission time intervals is shorter than a first processing interval required to finalize the processing of the respective symbols of each of the second transmission time intervals. E.g., the processing interval may include the HARQ processing.

The checking means 20 checks if the estimated future instantaneously required processing effort exceeds a capability of a terminal to process the symbols (S20). The capability may be a default capability (e.g. the minimum processing capability $\Psi_{UEmin}$), or the apparatus may receive an indication of the capability from the terminal.

If the future instantaneously required processing effort exceeds the capability (S20="yes"), the modifying means 30 modifies a future scheduling of the symbols/TTIs/sTTIs for the terminal (S30. For example, it may not schedule one or more of the first or second transmission time intervals to avoid exceeding the UE processing capability. Preferably, it does not schedule any second transmission time interval for a while.

FIG. 9 shows an apparatus according to an embodiment of the invention. The apparatus may be a terminal such as a UE, an IoT device, a MTC device, or an element thereof. FIG. 10 shows a method according to an embodiment of the invention. The apparatus according to FIG. 9 may perform the method of FIG. 10 but is not limited to this method. The method of FIG. 10 may be performed by the apparatus of FIG. 9 but is not limited to being performed by this apparatus.

The apparatus comprises informing means 110. The informing means 110 may be an informer. The informing means 110 may be an informing processor.

The informing means 110 informs a base station (S110) on at least one of
 a processing capability to process DL-SCH symbols received in one or more first transmission time intervals and one or more second transmission time intervals within a certain time interval,
 a scaling factor,
 a first delay, and
 a second delay.

The certain time interval may be the maximum allowed time interval allowed for processing the symbols of the first and second transmission intervals. For example, it may be determined based on the HARQ processing time, or based on any other requirement posed on the processing time. The certain time interval may be predefined.

Each of the first transmission time intervals comprises a first number of the symbols (e.g. TTI of 14 symbols). Each of the second transmission time intervals comprises a second number of the symbols (e.g. sTTI of 2, 3, or 7 symbols). The time for transmitting one of the symbols may be the same for the symbols of the first transmission time interval and the symbols of the second transmission time interval.

The first maximum possible number is larger than the second maximum possible number, and/or a second processing interval required to finalize the processing of the respective symbols of each of the second transmission time intervals is shorter than a first processing interval required to finalize the processing of the respective symbols of each of the second transmission time intervals. E.g., the processing interval may include the HARQ processing.

The scaling factor indicates a ratio of a second processing requirement required by the UE to process the symbols of one of the second transmission time intervals to a first processing requirement required by the UE to process the symbols of one of the first transmission time intervals if the second time duration is shorter than the first time duration.

The first delay indicates how long a start of the processing of the symbols of each of the first transmission time intervals after the respective first transmission time interval is delayed by the UE.

The second delay indicates how long a start of the processing of the symbols of each of the second transmission time intervals after the respective second transmission time interval is delayed by the UE.

Figure 12:
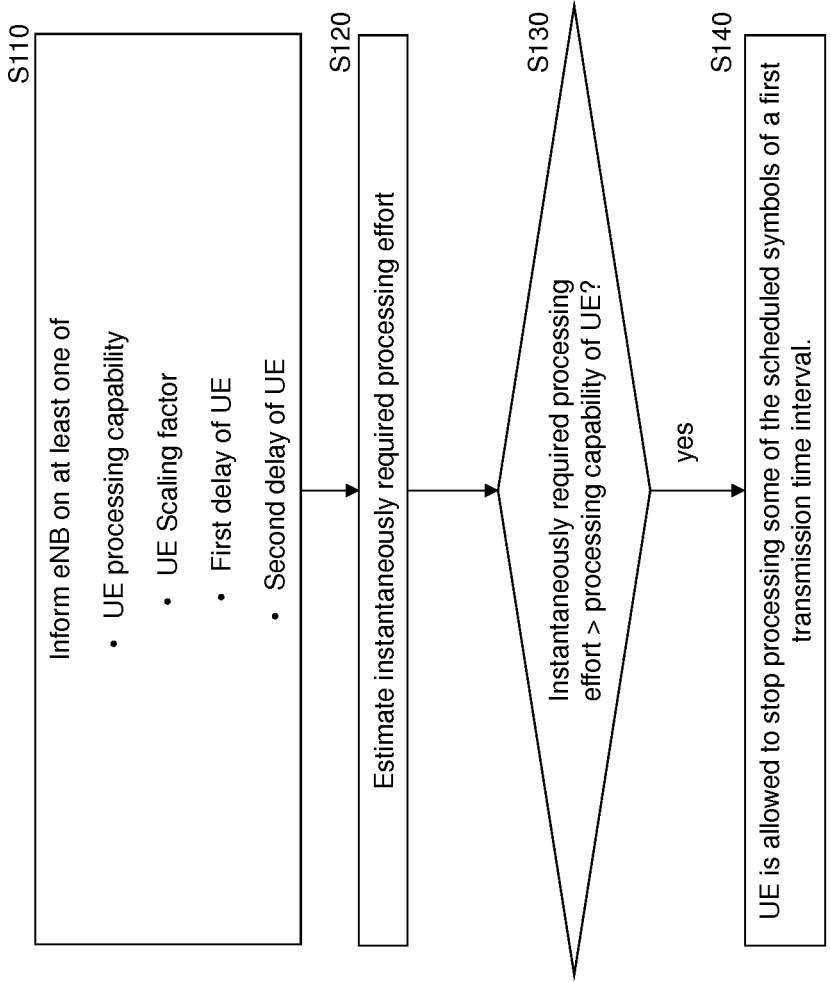
FIG. 12 shows a method according to an embodiment of the invention.
Figure 11:
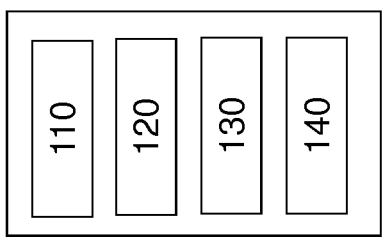
FIG. 11 shows an apparatus according to an embodiment of the invention.

FIG. 11 shows another embodiment of the invention which is based on the embodiment of FIG. 9. FIG. 12 shows the corresponding method.

In this embodiment, the apparatus comprises additionally an estimating means 120 (may be an estimator or an estimating processor), a checking means 130 (may be a checker or a checking processor), and a dropping means 140 (may be a dropper or a dropping processor).

The estimating means 120 estimates an instantaneously required processing effort (S120). The instantaneously required processing effort is required to process the scheduled DL-SCH symbols of scheduled one or more first transmission time intervals and scheduled one or more second transmission time intervals. Each of the first transmission time intervals comprises not more than a first maximum number of the symbols (e.g. TTI of 14 symbols). Each of the second transmission time intervals comprises not more than a second maximum number of the symbols (e.g. sTTI of 2, 3, or 7 symbols). The time for transmitting one of the symbols may be the same for the symbols of the first transmission time interval and the symbols of the second transmission time interval.

The checking means 130 checks if the estimated instantaneously required processing effort exceeds a capability of a terminal to process the symbols (S130). If the instantaneously required processing effort exceeds the capability (S130="yes"), the dropping means 140 allows the UE to stop processing of at least one of the scheduled DL-SCH symbols of one of the first transmission time intervals.

Figure 13:
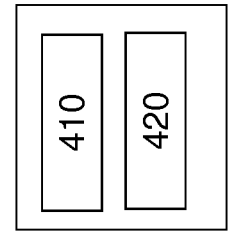
FIG. 13 shows an apparatus according to an embodiment of the invention.

FIG. 13 shows an apparatus according to an embodiment of the invention. The apparatus comprises at least one processor 410, at least one memory 420 including computer program code, and the at least one processor 410, with the at least one memory 420 and the computer program code, being arranged to cause the apparatus to at least perform at least one of the methods according to FIGS. 8, 10, and 12.

The durations of TTI and sTTI and HARQ-ACK times are according to present standards of 3GPP and the present discussion in 3GPP. However, these values are not limiting. Some embodiments of the invention may be employed if at least one of the durations and the HARQ-ACK times are different for two types of transmission time intervals. For example, some embodiments of the invention may be applied for a case where continuous scheduling of sTTI of 7 symbols is switched to continuous scheduling of sTTI of 2 (or 3) symbols.

HARQ is a particular case requiring that the bits of a transmitted TTI PDSCH are processed within a certain time after their reception. However, embodiments of the invention are not restricted to HARQ. Another example of a restriction on the processing time may be caused by latency requirements.

Embodiments of the invention are described with respect to a UE. A UE is a particular kind of a terminal. Other terminals may belong to embodiments of the invention. E.g., subscription devices in which embodiments of the invention are implemented may be an IoT device, a MTC device, a laptop, a tablet, a smartphone, a mobile phone, etc.

Some embodiments of the invention may be employed in 3GPP devices. However, embodiments of the invention are not limited to 3GPP devices. E.g. embodiments of the invention may be employed in other wireless communication systems with different TTIs such as an extension of WiFi.

One piece of information may be transmitted in one or plural messages from one entity to another entity. Each of these messages may comprise further (different) pieces of information.

Names of network elements, protocols, and methods are based on current standards. In other versions or other technologies, the names of these network elements and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

According to the above description, it should thus be apparent that example embodiments of the present invention provide, for example, a terminal such as a UE, an IoT device, a MTC device etc., or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example, a base station such as a eNB, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. Apparatus, comprising at least one processor, at least one memory including computer program code, and the at least one processor, with the at least one memory and the computer program code, being arranged to cause the apparatus to at least perform
   estimating a future instantaneously required processing effort required by a terminal to process symbols received in at least one first transmission time interval and at least one second transmission time interval;
   checking if the estimated future instantaneously required processing effort exceeds a capability of the terminal to process the symbols;
   modifying a future scheduling of the symbols for the terminal if the future instantaneously required processing effort exceeds the capability; wherein
   each of the first transmission time intervals comprises not more than a first maximum possible number of the symbols;
   each of the second transmission time intervals comprises not more than a second maximum possible number of the symbols; and at least one of:
      the first maximum possible number is larger than the second maximum possible number, and
      a second processing interval required to finalize the processing of the respective symbols of each of the second transmission time intervals is shorter than a first processing interval required to finalize the processing of the respective symbols of each of the first transmission time intervals.

2. The apparatus according to claim 1, wherein
   the first maximum possible number is larger than the second maximum possible number;
   a scaling factor indicates a ratio of a second processing requirement required by the terminal to process the symbols of one of the second transmission time intervals to a first processing requirement required by the terminal to process the symbols of one of the first transmission time intervals; and
   the estimating of the future instantaneously required processing effort is based on the scaling factor.

3. The apparatus according to claim 1, wherein
   a first delay indicates how long a start of the processing of the symbols of each of the first transmission time intervals after the respective first transmission time interval is delayed by the terminal;

a second delay indicates how long a start of the processing of the symbols of each of the second transmission time intervals after the respective second transmission time interval is delayed by the terminal; and the estimating of the maximum required processing effort is based on the respective at least one of the first delay and the second delay.

4. The apparatus according to claim 1, wherein the estimating comprises calculating the future instantaneously required processing effort $\psi$ at a time of an $i^{th}$ second transmission time interval sTTI i based on the following pseudo-code:

If PDSCH is scheduled in sTTI i for the terminal $$\Psi(i + \delta_{TTI}:i + K_{TTI} + \delta_{TTI}) = \Psi(i + \delta_{TTI}:i + K_{TTI} + \delta_{TTI}) + \frac{\Pi_{TTI}}{K_{TTI}} K_{sTTI}$$

$$i = i + N_{sTTI}$$

If sPDSCH is scheduled in sTTI i for the terminal $$\Psi(i + \delta_{sTTI}:i + K_{TTI} + \delta_{sTTI}) = \Psi(i + \delta_{TTI}:i + K_{TTI} + \delta_{TTI}) + \rho \frac{\Pi_{sTTI}}{K_{sTTI}}$$

$$i = i + 1$$

If nothing is scheduled in sTTI i for the terminal
  i=i+1 sPDSCH denotes symbols of the symbols scheduled in any of the second transmission time intervals;
PDSCH denotes symbols of the symbols scheduled in any of the first transmission time intervals;
$N_{sTTI}$ is a ratio of the first maximum possible number to the second maximum possible number;
$K_{TTI}$ is a first processing interval for processing the symbols of one of the first transmission time intervals in number of the second transmission time intervals;
$K_{sTTI}$ is a second processing interval for processing the symbols of the second transmission time interval in number of second transmission time intervals;
$\Pi_{TTI}$ is an instanteneous processing requirement for the processing of scheduled PDSCH of the first transmission time intervals normalized by the maximum possible instantaneous processing requirement for the processing of any scheduled PDSCH of the first transmission time intervals;
$\Pi_{sTTI}$ is an instanteneous processing requirement for the processing of scheduled sPDSCH of the second transmission time intervals normalized by the maximum possible instantaneous processing requirement for the processing of any scheduled PDSCH of the first transmission time intervals;
$\rho$ is a scaling factor indicating a ratio of a second processing requirement required by the terminal to process the symbols of one of the second transmission time intervals to a first processing requirement required by the terminal to process the symbols of one of the first transmission time intervals;
$\delta_{TTI}$ is a first delay indicating how long a start of the processing of the symbols of each of the first transmission time intervals after the respective first transmission time interval is delayed by the terminal;
$\delta_{sTTI}$ is a second delay indicating how long a start of the processing of the symbols of each of the second transmission time intervals after the respective second transmission time interval is delayed by the terminal.

5. The apparatus according to claim 1, wherein the at least one processor, with the at least one memory and the computer program code, being arranged to cause the apparatus to further perform
instructing to schedule the symbols for the terminal into at least one of one or more first transmission time intervals and one or more second transmission time intervals if the estimated future instantaneously required processing effort does not exceed the capability.

6. The apparatus according to claim 1, wherein,
if the terminal is capable to receive the symbols over plural aggregated carriers,
the at least one processor, with the at least one memory and the computer program code, being arranged to cause the apparatus to further perform the estimating, checking, and inhibiting separately for each of the carriers.

7. The apparatus according to claim 1, wherein,
if the terminal is capable to receive the symbols over plural aggregated carriers,
the at least one processor, with the at least one memory and the computer program code, being arranged to cause the apparatus to further perform the estimating, checking, and inhibiting for an aggregated capacity of the carriers.

8. The apparatus according to claim 1, wherein the at least one processor, with the at least one memory and the computer program code, being arranged to cause the apparatus to further perform
receiving, from the terminal, at least one of
an indication of the capability;
an indication of the scaling factor;
an indication of the first delay; and,
an indication of the second delay.

9. The apparatus according to claim 1, wherein
the symbols are scheduled in a sequence of the first transmission time intervals and the second transmission time intervals,
at least once in the sequence one of the second transmission time intervals follows after one of the first transmission time intervals; and the at least one processor, with the at least one memory and the computer program code, being arranged to cause the apparatus to further perform
inhibiting the estimating if the estimating would not include an instantaneous processing requirement to process the symbols of the one of the second transmission time intervals and an instantaneous processing requirement to process the symbols of the one of the first transmission time intervals.

10. Apparatus, comprising at least one processor, at least one memory including computer program code, and the at least one processor, with the at least one memory and the computer program code, being arranged to cause the apparatus to at least perform
informing a base station on at least one of a capability of a terminal to process symbols received within a predefined time interval in at least one first transmission time interval and at least one second transmission time interval, a scaling factor $\rho$, a first delay $\delta_{TTI}$, and a second delay $\delta_{sTTI}$; wherein
each of the first transmission time intervals comprises not more than a first maximum possible number of the symbols;

each of the second transmission time intervals comprises not more than a second maximum possible number of the symbols; and at least one of:
  the first maximum possible number is larger than the second maximum possible number, and
  a second processing interval required to finalize the processing of the respective symbols of each of the second transmission time intervals is shorter than a first processing interval required to finalize the processing of the respective symbols of each of the second transmission time intervals;
the scaling factor ρ indicates a ratio of a second processing requirement required by the terminal to process the symbols of one of the second transmission time intervals to a first processing requirement required by the terminal to process the symbols of one of the first transmission time intervals if the first maximum possible number is larger than the second maximum possible number;
the first delay $\delta_{TTI}$ indicates how long a start of the processing of the symbols of each of the first transmission time intervals after the respective first transmission time interval is delayed by the terminal;
the second delay $\delta_{sTTI}$ indicates how long a start of the processing of the symbols of each of the second transmission time intervals after the respective second transmission time interval is delayed by the terminal.

11. The apparatus according to claim 10, wherein the at least one processor, with the at least one memory and the computer program code, being arranged to cause the apparatus to at least perform
  calculating an instantaneously required processing effort ψ at a time of an $i^{th}$ second transmission time interval sTTI i based on the following pseudo-code:
  If PDSCH is received in sTTI i by the terminal $$\Psi(i + \delta_{TTI} : i + K_{TTI} + \delta_{TTI}) = \Psi(i + \delta_{TTI} : i + K_{TTI} + \delta_{TTI}) + \frac{\Pi_{TTI}}{K_{TTI}} K_{sTTI}$$

$$i = i + N_{sTTI}$$

If sPDSCH is received in sTTI i by the terminal $$\Psi(i + \delta_{sTTI} : i + K_{TTI} + \delta_{sTTI}) = \Psi(i + \delta_{TTI} : i + K_{TTI} + \delta_{TTI}) + \rho \frac{\Pi_{sTTI}}{K_{sTTI}}$$

$$i = i + 1$$

If nothing is received in sTTI i by the terminal
    i=i+1
  checking if the instantaneously required processing effort exceeds the capability;
  discarding the processing of the symbols of at least one of the first transmission time intervals if the instantaneously required processing effort exceeds the capability; wherein
  sPDSCH denotes symbols of the symbols received in any of the second transmission time intervals;
  PDSCH denotes symbols of the symbols received in any of the first transmission time intervals;
  $N_{sTTI}$ is a ratio of the first maximum possible number to the second maximum possible number;
  $K_{TTI}$ is a first processing interval for processing the symbols of one of the first transmission time intervals in number of the second transmission time intervals;
  $K_{sTTI}$ is a second processing interval for processing the symbols of the second transmission time interval in number of second transmission time intervals;
  $\Pi_{TTI}$ is an instantaneous processing requirement for the processing of received PDSCH of the first transmission time intervals normalized by the maximum possible instantaneous processing requirement for the processing of any received PDSCH of the first transmission time intervals;
  $\Pi_{sTTI}$ is an instantaneous processing requirement for the processing of received sPDSCH of the second transmission time intervals normalized by the maximum possible instantaneous processing requirement for the processing of any received PDSCH of the first transmission time intervals.

12. The apparatus according to claim 10, wherein the capability of the terminal $\psi_{UE}$ fulfills at least one of the following conditions:

$$\Psi_{nom} \leq \Psi_{UE} \leq \Psi_{max}$$

$$\Psi_{nom,sTTI} \leq \Psi_{UE} \leq \varsigma_{md} \max$$

wherein
  $\psi_{nom}$ denotes an instantaneously required processing effort to process the symbols if the symbols are received only in first transmission time intervals;
  $\psi_{nom,sTTI}$ denotes an instantaneously required processing effort to process the symbols if the symbols are received only in second transmission time intervals; and
  $\psi_{max}$ denotes a maximum instantaneously required processing effort to process the symbols if, after the symbols are received only in first transmission time intervals, the symbols are received only in second transmission time intervals.

13. The apparatus according to claim 12, wherein the maximum required processing effort $\psi_{max}$ is estimated based on the following formulas:

$$\Psi_{max} = \frac{\alpha_{TTI} \Pi_{TTI,max} + \rho \Pi_{sTTI,max}}{\Pi_{TTI,max}}$$

$$\alpha_{TTI} = \frac{K_{TTI} - N_{sTTI}}{K_{TTI}}.$$

14. The apparatus according to claim 10, wherein the at least one processor, with the at least one memory and the computer program code, being arranged to cause the apparatus to further perform
  normalizing the capability by one of $\psi_{nom}$, $\psi_{nom,sTTI}$, and $\psi_{max}$ to obtain a normalized capability, wherein
  the base station is informed on the normalized capability;
  $\psi_{nom}$ denotes a maximum instantaneously required processing effort to process the symbols if the symbols are received only in first transmission time intervals;
  $\psi_{nom,sTTI}$ denotes a maximum instantaneously required processing effort to process the symbols if the symbols are received only in second transmission time intervals; and
  $\psi_{max}$ denotes a maximum instantaneously required processing effort to process the symbols if, after the symbols are received only in first transmission time intervals, the symbols are received only in second transmission time intervals.

15. The apparatus according to claim 10, wherein the at least one processor, with the at least one memory and the computer program code, being arranged to cause the apparatus to further perform
calculating an excess capability based on the capability, $\psi_{max}$, and one of $\psi_{nom}$ and $\psi_{nom,sTTI}$, wherein
the excess capability is 0% if the capability is the one of $\psi_{nom}$ and $\psi_{nom,sTTI}$,
the excess capability is 100% if the capability is $\psi_{max}$,
the excess capability is calculated by linear interpolation between the one of $\psi_{nom}$ and $\psi_{nom,sTTI}$ and $\psi_{max}$ if the capability is between the one of $\psi_{nom}$ and $\psi_{nom,sTTI}$ and $\psi_{max}$;
the base station is informed on the excess capability;
$\psi_{nom}$ denotes a maximum instantaneously required processing effort to process the symbols if the symbols are received only in first transmission time intervals;
$\psi_{nom,sTTI}$ denotes a maximum instantaneously required processing effort to process the symbols if the symbols are received only in second transmission time intervals; and
$\psi_{max}$ denotes a maximum instantaneously required processing effort to process the symbols if, after the symbols are received only in first transmission time intervals, the symbols are received only in second transmission time intervals.

16. Method, comprising
estimating a future instantaneously required processing effort required by a terminal to process symbols received in at least one first transmission time interval and at least one second transmission time interval;
checking if the estimated future instantaneously required processing effort exceeds a capability of the terminal to process the symbols;
modifying a future scheduling of the symbols for the terminal if the future instantaneously required processing effort exceeds the capability; wherein
each of the first transmission time intervals comprises not more than a first maximum possible number of the symbols;
each of the second transmission time intervals comprises not more than a second maximum possible number of the symbols; and at least one of:
the first maximum possible number is larger than the second maximum possible number, and
a second processing interval required to finalize the processing of the respective symbols of each of the second transmission time intervals is shorter than a first processing interval required to finalize the processing of the respective symbols of each of the first transmission time intervals.

17. The method according to claim 16, wherein
the first maximum possible number is larger than the second maximum possible number;
a scaling factor indicates a ratio of a second processing requirement required by the terminal to process the symbols of one of the second transmission time intervals to a first processing requirement required by the terminal to process the symbols of one of the first transmission time intervals; and
the estimating of the future instantaneously required processing effort is based on the scaling factor.

18. The method according to claim 16, wherein
a first delay indicates how long a start of the processing of the symbols of each of the first transmission time intervals after the respective first transmission time interval is delayed by the terminal;

a second delay indicates how long a start of the processing of the symbols of each of the second transmission time intervals after the respective second transmission time interval is delayed by the terminal; and
the estimating of the maximum required processing effort is based on the respective at least one of the first delay and the second delay.

19. The method according to claim 16, wherein the estimating comprises
calculating the future instantaneously required processing effort $\psi$ at a time of an $i^{th}$ second transmission time interval sTTI i based on the following pseudo-code:
If PDSCH is scheduled in sTTI i for the terminal $$\Psi(i+\delta_{TTI}:i+K_{TTI}+\delta_{TTI})=\Psi(i+\delta_{TTI}:i+K_{TTI}+\delta_{TTI})+\frac{\Pi_{TTI}}{K_{TTI}}K_{sTTI}$$

$$i=i+N_{sTTI}$$

If sPDSCH is scheduled in sTTI i for the terminal $$\Psi(i+\delta_{sTTI}:i+K_{TTI}+\delta_{sTTI})=\Psi(i+\delta_{TTI}:i+K_{TTI}+\delta_{TTI})+\rho\frac{\Pi_{sTTI}}{K_{sTTI}}$$

$$i=i+1$$

If nothing is scheduled in sTTI i for the terminal
i=i+1
sPDSCH denotes symbols of the symbols scheduled in any of the second transmission time intervals;
PDSCH denotes symbols of the symbols scheduled in any of the first transmission time intervals;
$N_{sTTI}$ is a ratio of the first maximum possible number to the second maximum possible number;
$K_{TTI}$ is a first processing interval for processing the symbols of one of the first transmission time intervals in number of the second transmission time intervals;
$K_{sTTI}$ is a second processing interval for processing the symbols of the second transmission time interval in number of second transmission time intervals;
$\Pi_{TTI}$ is an instantaneous processing requirement for the processing of scheduled PDSCH of the first transmission time intervals normalized by the maximum possible instantaneous processing requirement for the processing of any scheduled PDSCH of the first transmission time intervals;
$\Pi_{sTTI}$ is an instantaneous processing requirement for the processing of scheduled sPDSCH of the second transmission time intervals normalized by the maximum possible instantaneous processing requirement for the processing of any scheduled PDSCH of the first transmission time intervals;
$\rho$ is a scaling factor indicating a ratio of a second processing requirement required by the terminal to process the symbols of one of the second transmission time intervals to a first processing requirement required by the terminal to process the symbols of one of the first transmission time intervals;
$\delta_{TTI}$ is a first delay indicating how long a start of the processing of the symbols of each of the first transmission time intervals after the respective first transmission time interval is delayed by the terminal;
$\delta_{sTTI}$ is a second delay indicating how long a start of the processing of the symbols of each of the second transmission time intervals after the respective second transmission time interval is delayed by the terminal.

20. Method, comprising informing a base station on at least one of a capability of a terminal to process symbols received within a predefined time interval in at least one first transmission time interval and at least one second transmission time interval, a scaling factor $\rho$, a first delay $\delta_{TTI}$, and a second delay $\delta_{sTTI}$; wherein each of the first transmission time intervals comprises not more than a first maximum possible number of the symbols;

each of the second transmission time intervals comprises not more than a second maximum possible number of the symbols; and at least one of:

- the first maximum possible number is larger than the second maximum possible number, and
- a second processing interval required to finalize the processing of the respective symbols of each of the second transmission time intervals is shorter than a first processing interval required to finalize the processing of the respective symbols of each of the second transmission time intervals;

the scaling factor $\rho$ indicates a ratio of a second processing requirement required by the terminal to process the symbols of one of the second transmission time intervals to a first processing requirement required by the terminal to process the symbols of one of the first transmission time intervals if the first maximum possible number is larger than the second maximum possible number;

the first delay $\delta_{TTI}$ indicates how long a start of the processing of the symbols of each of the first transmission time intervals after the respective first transmission time interval is delayed by the terminal;

the second delay $\delta_{sTTI}$ indicates how long a start of the processing of the symbols of each of the second transmission time intervals after the respective second transmission time interval is delayed by the terminal.

* * * * *